US007981959B2

(12) United States Patent
Nodera et al.

(10) Patent No.: US 7,981,959 B2
(45) Date of Patent: Jul. 19, 2011

(54) RESIN COMPOSITION, PROCESS FOR PRODUCING THE SAME AND MOLDING OF THE RESIN COMPOSITION

(75) Inventors: Akio Nodera, Chiba (JP); Yusuke Hayata, Chiba (JP); Masanori Sera, Chiba (JP); Takenori Fujimura, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 551 days.

(21) Appl. No.: 11/908,292

(22) PCT Filed: Mar. 13, 2006

(86) PCT No.: PCT/JP2006/304920
§ 371 (c)(1),
(2), (4) Date: Oct. 7, 2008

(87) PCT Pub. No.: WO2006/098283
PCT Pub. Date: Sep. 21, 2006

(65) Prior Publication Data
US 2009/0076195 A1 Mar. 19, 2009

(30) Foreign Application Priority Data
Mar. 16, 2005 (JP) .................................. 2005-075984

(51) Int. Cl.
*C08K 3/04* (2006.01)
*C08J 3/20* (2006.01)
(52) U.S. Cl. ......................... 524/496; 523/351; 977/742
(58) Field of Classification Search .................. 524/495, 524/496; 523/351; 977/742
See application file for complete search history.

(56) References Cited

U.S. PATENT DOCUMENTS

| 5,049,595 | A | * | 9/1991 | Dethlefs et al. ............... 523/351 |
| 5,840,381 | A | * | 11/1998 | Ohtsuka ........................ 428/34.4 |
| 6,331,265 | B1 | * | 12/2001 | Dupire et al. ................ 264/289.3 |
| 6,919,395 | B2 | * | 7/2005 | Rajagopalan et al. ......... 524/432 |
| 6,936,653 | B2 | * | 8/2005 | McElrath et al. .............. 524/496 |
| 2005/0171230 | A1 | * | 8/2005 | Ishikawa et al. ............... 523/102 |
| 2007/0092826 | A1 | * | 4/2007 | Landry-Coltrain et al. .. 430/201 |
| 2008/0033097 | A1 | | 2/2008 | Hayata et al. |
| 2008/0176978 | A1 | | 7/2008 | Nodera |

FOREIGN PATENT DOCUMENTS

| JP | 09 115703 | 5/1997 |
| JP | 11 501690 | 2/1999 |
| JP | 2003 100147 | 4/2003 |
| JP | 2003 192914 | 7/2003 |
| WO | 03 064536 | 8/2003 |
| WO | 03 070790 | 8/2003 |

* cited by examiner

*Primary Examiner* — Tae H Yoon
(74) *Attorney, Agent, or Firm* — Oblon, Spivak, McClelland, Maier & Neustadt, L.L.P.

(57) ABSTRACT

The present invention provides a resin composition including 100 parts by mass of a resin component containing 80 to 99 mass % of a thermoplastic resin (A) and 20 to 1 mass % of a side-chain crystalline polymer (B), and 0.1 to 30 parts by mass of carbon nanotube (C). The composition has a stabilized thermoplastic resin/side-chain crystalline polymer phase structure, is free from laminar peeling, and is excellent in conductive (antistatic) property, solvent resistance, flow characteristics, flame retardancy, impact resistance, molding appearance, etc.

14 Claims, No Drawings

RESIN COMPOSITION, PROCESS FOR PRODUCING THE SAME AND MOLDING OF THE RESIN COMPOSITION

TECHNICAL FIELD

The present invention relates to a novel resin composition and, more particularly, to a resin composition containing a thermoplastic resin, a side-chain crystalline polymer, and carbon nanotube, which composition is excellent in conductive (antistatic) property, solvent resistance, flame retardancy, impact resistance, molding appearance, and other properties. The invention also relates to a process for producing the resin composition, and to a molded product of the resin composition.

BACKGROUND ART

In recent years, development in electronics-related techniques has resulted in the rapid spread of information-processing apparatuses and electronic office apparatuses.

When a large number of electronic apparatuses are operated, there frequently occur electromagnetic disturbance of apparatuses caused by the noise generated by electronic parts in the vicinity thereof, misoperation caused by electrostaticity, and other problematic phenomena, and such problems have become more serious.

In order to solve these problems, there is demand for a material exhibiting an excellent conductive (antistatic) property and charge-controllability.

Hitherto, there have been widely employed conductive polymer materials which are provided through incorporating a conductive filler or a similar material into a polymer material exhibiting low electrical conductivity.

Generally employed conductive fillers are metallic fiber, metallic powder, carbon black, carbon fiber, etc. When metallic fiber or metallic powder is used as a conductive filler, excellent conductivity is attained, but the materials containing such a conductive filler exhibit poor corrosion resistance and mechanical strength, which is problematic.

When carbon black is used as a conductive filler, conductive carbon black products attaining high conductivity through addition in a small amount such as Ketjen Black, Vulcan XC72, and Acetylene Black are employed. However, these carbon black products have poor dispersibility in resin.

Such poor dispersibility of carbon black affects the conductivity of the resin composition, and tailored blending and mixing techniques are essential for attaining consistent conductivity.

When carbon fiber is used as a conductive filler, a conventional reinforcing carbon fiber realizes desired strength and elastic modulus. However, in order to attain satisfactory conductivity, such a filler must be charged at high density, resulting in impairment in intrinsic physical properties of resin.

In addition, in the production of molded products with a complex shape, the conductive filler is localized in the products, causing unsatisfactory variation of conductivity in each product.

Among carbon fiber products, a fiber product having a smaller diameter provides a larger contact area between resin and fiber filaments as compared with the case where a fiber product having a larger diameter is used in the same amount, and is a promising conductivity-imparting agent.

For example, an ultrafine carbon fibril exhibiting excellent conductivity is disclosed (see, for example, Patent Document 1).

However, in mixing with a resin, dispersibility of the carbon fibril is unsatisfactory, and appearance of the molded products is unsatisfactorily impaired.

When a resin is colored by use, as a coloring agent, of a known carbon black product for pigment use, the product must be used in a large amount so as to develop black color. Therefore, such a carbon black is problematic in terms of dispersibility in resin and appearance of molded products.

Although an approach of addition of an ultrafine carbon fibril is disclosed (see, for example, Patent Document 2), the document never teaches the flame retardancy attributable to the ultrafine carbon fibril.

Since the flame retardancy attained in the disclosed approach is unsatisfactory, the approach cannot be employed for resin products requiring high flame retardancy.

Also known is a resin composition containing a thermoplastic resin, carbon nanotube, and at least one compound selected from among a phosphorus compound, a phenol compound, an epoxy compound, and a sulfur compound (see, for example, Patent Document 3). The Examples in the document merely discloses a polycarbonate resin/acrylonitrile-butadiene-styrene resin, and never discloses a polycarbonate resin/side-chain crystalline polymer.

Furthermore, when carbon nanotube is used in a large amount in order to attain conductive performance, appearance of the molded product is impaired, and impact resistance is lowered. The document does not disclose improvement in solvent resistance.

Conventional polycarbonate resin/polyolefin-based resin alloys have poor compatibility. Therefore, impact resistance is unsatisfactory, and the molded products thereof undergo laminar peeling, thereby impairing the product appearance. Thus, incorporation of a compatibilizer or a similar agent is essential.

According to conventional techniques, moldability such as mold-releasability cannot be enhanced, and a releasing agent or a similar agent is generally added to resin. Therefore, enhancement in releasability is unsatisfactory, and heat resistance and impact resistance may be lowered.

When carbon nanotube is used in a large amount, in some cases, flow characteristics is impaired, and moldability lowers considerably.

Furthermore, when carbon nanotube is added to a thermoplastic resin for general use, dispersion of carbon nanotube is unsatisfactory. When compounding is performed under severe conditions, carbon nanotube is broken. In other words, a large amount of carbon nanotube for attaining conductivity causes impairment of appearance and physical properties of molded products, or an increase in viscosity, thereby failing to form molded products.

[Patent Document 1]
Japanese Kohyo Patent Publication No. 62-500943
[Patent Document 2]
Japanese Patent Application Laid-Open (kokai) No. 3-74465
[Patent Document 3]
Japanese Patent Application Laid-Open (kokai) No. 2004-182842

DISCLOSURE OF THE INVENTION

Thus, an object of the present invention is to provide a resin composition comprising a thermoplastic resin, a side-chain crystalline polymer, and carbon nanotube, which composition has a stabilized thermoplastic resin/side-chain crystalline polymer phase structure, is free from laminar peeling, and is excellent in conductive (antistatic) property, solvent resistance, flow characteristics, flame retardancy, impact resistance, molding appearance, etc. Another object of the invention is to provide a process for producing the resin composition. Still another object of the invention is to provide a molded product of the resin composition.

The present inventors have conducted extensive studies in order to attain the aforementioned objects, and have found that, through incorporating a predetermined amount of carbon nanotube into a mixture containing a thermoplastic resin and a side-chain crystalline polymer at a specific compositional ratio, the thermoplastic resin/side-chain crystalline polymer phase structure of the mixture is stabilized, and re-aggregation of the side-chain crystalline polymer during melting and domain orientation during injection molding can be mitigated. The present invention has been accomplished on the basis of this finding.

Accordingly, the present invention provides the following.
1. A resin composition comprising
100 parts by mass of a resin component containing 80 to 99 mass % of a thermoplastic resin (A) and 20 to 1 mass % of a side-chain crystalline polymer (B), and
0.1 to 30 parts by mass of carbon nanotube (C) (hereinafter the resin composition is referred to as "resin composition 1").
2. A resin composition as described in 1 above, wherein the component (A) is an aromatic polycarbonate resin.
3. A resin composition as described in 1 or 2 above, wherein the component (A) has a viscosity average molecular weight of 10,000 to 40,000.
4. A resin composition as described in any of 1 to 3 above, characterized by the following (1) and (2): (1) the component (B) is a crystalline resin formed from a C≧10 higher αolefin; and (2) the crystalline resin has a melting point TmD which is defined as a peak top of a peak observed in a melt endothermic curve obtained from a sample of the crystalline resin which has been maintained at −10° C. for five minutes and heated to 190° C. at 10° C./min under nitrogen, and, the crystalline resin shows a single peak, and has a melting point Tm of 20 to 100° C., wherein the melting point Tm is defined as a peak top of the single peak observed in a melt endothermic curve obtained from the sample which has been maintained at 190° C. for five minutes, cooled to −10° C. at 5° C./min, maintained at −10° C. for five minutes, and heated to 190° C. at 10° C./min, the two melting points being measured by means of a differential scanning calorimeter (DSC).
5. A resin composition as described in any of 1 to 4 above, wherein the component (C) has an amorphous carbon particle content of 20 mass % or less, an outer diameter of 0.5 to 120 nm, and a length of 500 nm or more.
6. A resin composition as described in any of 1 to 5 above, which is employed for an OA apparatus, an information and communication apparatus, an automobile part, or a household electric appliance.
7. A process for producing a resin composition as recited in any of 1 to 6 above, characterized in that the process comprises adding component (C) to component (B) which is in a molten state, kneading the formed mixture, adding component (A) to the kneaded product, and melt-kneading the resultant mixture.
8. A resin composition which is produced by adding 70 to 1 mass % of component (C) to 30 to 99 mass % of component (B) which is in a molten state, kneading the formed mixture, and subsequently, cooling the kneaded product to lower than 20° C. (hereinafter the composition is referred to as "resin composition 2").
9. A molded product formed from a resin composition as recited in any of 1 to 8 above.

The resin composition of the present invention has a stabilized thermoplastic resin/side-chain crystalline polymer phase structure, is free from laminar peeling, and is excellent in conductive (antistatic) property, solvent resistance, flow characteristics, flame retardancy, impact resistance, molding appearance, etc., and in some cases, is imparted with heat radiating property.

In addition, the resin composition of the present invention exhibits excellent flow characteristics and mold releasability, thereby attaining enhanced moldability.

Further, as compared with carbon fiber, carbon nanotube can be incorporated into a matrix in a much larger (about $10^6$ times) amount by number of filament, whereby laminar peeling can be prevented, and excellent conductivity can be imparted.

When the thermoplastic resin/side-chain crystalline polymer is alloyed, the amount of carbon nanotube incorporated to a matrix can be reduced.

BEST MODES FOR CARRYING OUT THE INVENTION

The resin composition 1 of the present invention is directed to a resin composition comprising 100 parts by mass of a resin component containing 80 to 99 mass % of a thermoplastic resin (A) and 20 to 1 mass % of a side-chain crystalline polymer (B), and 0.1 to 30 parts by mass of carbon nanotube (C).

Among resin components, when the amount of component (B) is less than 1 mass %, conductivity and flow characteristics are unsatisfactory, whereas when the amount is in excess of 20 mass %, impact resistance and heat resistance decrease, and laminar peeling or other phenomena occur in some cases.

Preferably, the component (A) content and component (B) content are 90 to 99 mass % and 10 to 1 mass %, respectively.

When the amount of carbon nanotube (C) incorporated into component (A) and component (B) (total 100 parts by mass) is 0.1 parts by mass or more (unless otherwise specified, the unit "part(s)" is on a mass basis), conductive (antistatic) property and flame retardancy of the resin composition are enhanced, whereas when the amount is 30 parts or less, performance of the resin composition is enhanced commensurate with addition, and impact resistance and moldability are enhanced.

The amount of component (C) is preferably 0.3 to 10 parts.

The resin composition 2 of the present invention is directed to a resin composition which is produced by adding 70 to 1 mass % of component (C) to 30 to 99 mass % of component (B) which is in a molten state, kneading the formed mixture, and subsequently, cooling the kneaded product to lower than 20° C. When the component (B) content and component (C) content fall within the above ranges, the produced resin composition is excellent in conductive (antistatic) property, molding appearance, etc.

Preferably, the component (B) content and component (C) content are 40 to 95 mass % and 60 to 5 mass %, respectively, more preferably 50 to 90 mass % and 50 to 10 mass %, respectively.

When the amount of carbon nanotube is 1 mass % or more, the resin composition has an enhanced conductive (antistatic) property, whereas when the amount is 70 mass % or less, performance of the resin composition is enhanced commensurate with addition, and toughness and flame retardancy are enhanced.

The cooling temperature is preferably 50° C. or lower, more preferably 40° C. or lower.

Notably, component (A) and, in accordance with needs, component (B) and component (C) may be added to the resin composition 2 of the present invention, to thereby form resin composition 1 of the present invention.

In the resin composition of the present invention, examples of the thermoplastic resin (A) include polycarbonate resin, styrene-based resin, polyethylene resin, polypropylene resin, poly(methyl methacrylate) resin, poly(vinyl chloride) resin, acetyl cellulose resin, polyamide resin, polyester resin (PET, PBT, etc.), polyacrylonitrile resin, polyphenylene oxide resin (PPO), polyketone resin, polysulfone resin, polyphenylene sulfide resin (PPS), fluorine-containing resin, silicon-containing resin, polyimide resin, polybenzimidazole resin, and polyamide elastomer.

No particular limitation is imposed on the polycarbonate resin, and a variety of polycarbonate resins may be employed.

Typically, an aromatic polycarbonate resin produced through reaction between a dihydric phenol and a carbonate precursor is employed.

Specifically, a dihydric phenol is reacted with a carbonate precursor through the solution method or melt transesterification method, more specifically, a dihydric phenol is reacted with phosgene, or a dihydric phenol is transesterified with diphenyl carbonate or similar carbonate, to thereby produce a polycarbonate resin for use in the present invention.

A variety of dihydric phenols may be employed. Among others, examples include 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl) cycloalkane, bis(4-hydroxyphenyl) oxide, bis(4-hydroxyphenyl) sulfide, bis(4-hydroxyphenyl) sulfone, bis (4-hydroxyphenyl) sulfoxide, bis(4-hydroxyphenyl) ketone, and halo-substituted species thereof.

A particularly preferred dihydric phenol is produced from a bis(hydroxyphenyl)alkane, particularly bisphenol A.

Examples of carbonate precursors include carbonyl halides, carbonyl esters, and haloformates. Specific examples include phosgene, dihydric phenol dihaloformates, diphenyl carbonate, dimethyl carbonate, and diethyl carbonate.

In addition, examples of the dihydric phenol include hydroquinone, resorcinol, and catechol.

These dihydric phenols may be used singly or in combination of two or more species.

The polycarbonate resin may have a branched structure. Examples of the branching agent include 1,1,1-tris(4-hydroxyphenyl)ethane, α,α',α"-tris(4-hydroxyphenyl)-1,3,5-triisopropylbenzene, phloroglucin, trimellitic acid, and isatinbis (o-cresol). In order to modify molecular weight, phenol, p-t-butylphenol, p-t-octylphenol, p-cumylphenol, etc. may be employed.

The polycarbonate resin employed in the present invention may be a copolymer having a polycarbonate moiety and a polyorganosiloxane moiety, or a polycarbonate resin including the copolymer.

Alternatively, there may also be employed a polyester-polycarbonate resin produced through polymerization in the presence of a bi-functional carboxylic acid such as terephthalic acid or an ester precursor such as the corresponding ester-forming derivative.

Needless to say, a mixture of a variety of polycarbonate resins may be employed.

From the viewpoint of mechanical strength and moldability, the polycarbonate resin employed in the present invention preferably has a viscosity average molecular weight of 10,000 to 100,000, particularly preferably 14,000 to 40,000.

The viscosity average molecular weight (M) of the polycarbonate resin of the present invention is determined through the following procedure. Firstly, polycarbonate resin (0.7 g) is dissolved in methylene chloride (100 mL) at 20° C., and specific viscosity (ηSP) of the solution is determined by means of an Ostwald viscometer, on the basis of the formula:

Specific viscosity($\eta SP$)=$(t-t_0)/t_0$ (wherein $t_0$ represents the time required for predetermined flowing of methylene chloride, and t represents the time required for predetermined flowing of the sample).

From the thus-determined specific viscosity, viscosity average molecular weight is calculated from the following formulas:

($\eta SP$)/$c$=[$\eta$]+0.45×[$\eta$]$^2 c$

[$\eta$]=1.23×10$^{-5}$M$^{0.83}$ (wherein [$\eta$] represents viscosity average molecular weight and c represents a polymer concentration).

For determining the viscosity average molecular weight of the resin composition of the present invention, the resin composition is dissolved in 20- to 30-times volume of methylene chloride, and the solution is collected through filtration with Celite. The solution is well dried, to thereby yield a solid which is soluble in methylene chloride.

The thus-produced solid (0.7 g) is dissolved in methylene chloride (100 mL), and specific viscosity (ηSP) of the solution is determined at 20° C. by means of an Ostwald viscometer. The viscosity average molecular weight is calculated from the aforementioned formulas.

Examples of the styrene-based resin include polymers produced through polymerization of a monomer or a monomer mixture which contains monovinyl aromatic monomer(s) such as styrene and α-methylstyrene (20 to 100 mass %), cyanovinyl monomer(s) such as acrylonitrile and methacrylonitrile (0 to 60 mass %), and other vinyl monomers copolymerizable with these monomers such as maleimide and methyl(meth)acrylate (0 to 50 mass %).

Specific examples of these polymers include polystyrene (GPPS) and acrylonitrile-styrene copolymer (AS resin).

A preferably employed styrene-based resin is a rubber-modified styrene-based resin.

A preferred rubber-modified styrene-based resin is an impact resistance styrene-based resin in which at least rubber is graft-polymerized with a styrenic monomer.

Examples of the rubber-modified styrene-based resin include impact resistance polystyrene (HIPS) in which styrene is polymerized with a rubber such as polybutadiene; ABS resin formed through polymerization of polybutadiene, acrylonitrile, and styrene; and MBS resin polybutadiene formed through polymerization of, polybutadiene, methyl methacrylate, and styrene. These rubber-modified styrene-based resins may be used in combination of two or more species. Needless to say, a mixture with the aforementioned unmodified styrene-based resin may also be employed.

Specific examples of the above rubber include polybutadiene, rubber polymers containing acrylate and/or methacrylate, styrene-butadiene-styrene rubber (SBS), styrene-butadiene rubber (SBR), butadiene-acryl rubber, isoprene rubber, isoprene-styrene rubber, isoprene-acryl rubber, and ethylene-propylene rubber.

Of these, polybutadiene is particularly preferred.

The polybutadiene employed in the invention may be a low-cis polybutadiene (e.g., 1,2-vinyl bonds: 1 to 30 mol %, 1,4-cis bonds: 30 to 42 mol %), or a high-cis polybutadiene (e.g., 1,2-vinyl bonds: 20 mol % or less, 1,4-cis bonds 78 mol % or more). A mixture thereof may also be employed.

A polymer alloy formed from two or more thermoplastic resins may be used as component (A).

Examples of particularly preferred polymer alloys include polycarbonate resin/acrylonitrile-butadien-styrene resin, polycarbonate resin/high impact polystyrene resin, polycarbonate resin/polyester, and polyphenylene oxide resin/high impact polystyrene resin.

When a polymer alloy is used, an elastomer may be added to the polymer alloy in order to enhance impact strength.

Examples of preferred elastomers include styrene-based elastomers such as styrene-(1-butene)-styrene triblock copolymer (SBS) and styrene-(ethylene/1-butene)-styrene triblock copolymer (SEBS); olefin-based elastomers; and core-shell type elastomers such as MBS and methyl methacrylate-acrylonitrile-styrene resin (MAS).

Examples of preferred thermoplastic resins include amorphous aromatic polymers such as polycarbonate resin, styrene resin, and acrylonitrile-butadiene-styrene resin.

In the resin composition of the present invention, the side-chain crystalline polymer (B) is a so-called comb-like polymer, which is characterized in that the polymer has a backbone (main chain) formed of an organic structure and side chains formed of an aliphatic and/or aromatic structure. The side chains can be included in the crystal structure of the polymer.

The length of each side chain is five times or more the distance between adjacent side chains.

Examples of the side-chain crystalline polymer include α-olefin polymers, alkyl acrylate polymers, alkyl methacrylate polymers, alkyl ethylene oxide polymers, polysiloxanes, and acrylamide polymers.

Of these, α-olefin polymers, which are produced from inexpensive and readily available α-olefin, are particularly preferred.

The α-olefin-based polymer employed in the present invention is a polymer formed from a C≧10 higher α-olefin as a predominant component (hereinafter may be referred to as higher α-olefin polymer).

The higher α-olefin is preferably a C10 to C40 olefin, more preferably a C14 to C24 olefin.

When the olefin is C<10, the polymer fails to have crystallinity.

The higher α-olefin polymer preferably has a C≧10 higher α-olefin content of 50 to 100 mol %, more preferably 65 to 100 mol %, still more preferably 80 to 100 mol %, yet more preferably 90 to 100 mol %, particularly preferably 100 mol %.

When the higher α-olefin polymer has a C≧10 higher α-olefin content less than 50 mol %, crystallinity of side chains decreases.

The higher α-olefin polymer preferably has an isotactic structure. Specifically, the tacticity index (M2) is 50 to 90 mol %, preferably 55 to 85 mol %, more preferably 55 to 75 mol %.

Through regulating the tacticity index to a medium value, or to a medium value or higher, the objects of the present invention can be attained.

When M2 is in excess of 90 mol %, crystallinity excessively increases, thereby lowering compatibility with other resins and waxes.

When M2 is less than 50 mol %, crystallinity decreases, thereby lowering solvent resistance.

The tacticity index (M4), which is an index similar to the pentad isotacticity, is preferably 25 to 60 mol %, more preferably 25 to 45 mol %.

The tacticity index (MR), which is an index for disorderness in isotacticity, is preferably 2.5 mol % or more, more preferably 5 mol % or more, still more preferably 10 mol % or more.

These tacticity indices M2, M4, and MR were determined through a method proposed by T. Asakura, M. Demura, and Y. Nishiyama (Macromolecules, 24, 2334 (1991)).

Specifically, these indices can be determined on the basis of splitting of the $^{13}$CNMR peak attributed to α-position $CH_2$ carbon caused by difference in tacticity.

The smaller the values of M2 and M4, the smaller isotacticity. The higher the value of MR, the more disordered the tacticity.

$^{13}$CNMR was measured by means of the following apparatus and under the following conditions.
Apparatus: EX-400 (product of JEOL)
Measuring temperature: 130° C.
Pulse width: 45°
Integration: 1,000 times
Solvent: 1,2,4-Trichlorobenzene and heavy benzene (90:10 by vol.) mixture The tacticity indices M2, M4, and MR were calculated as follows.

In the NMR spectrum, significant six absorption peaks attributed to the solvent mixture are observed in a range of 127 to 135 ppm. The peak value of the fourth peak (from the lowest magnetic field), 131.1 ppm, was employed as a standard value of chemical shift.

Absorption peaks attributed to α-position $CH_2$ carbon were observed at about 34 to about 37 ppm.

M2, M4, and MR (mol %) were calculated from the following equations:

$$M2 = [(\text{integral intensity at 36.2 to 35.3 ppm})/(\text{integral intensity at 36.2 to 34.5 ppm})] \times 100$$

$$M4 = [(\text{integral intensity at 36.2 to 35.6 ppm})/(\text{integral intensity at 36.2 to 34.5 ppm})] \times 100$$

$$MR = [(\text{integral intensity at 35.3 to 35.0 ppm})/(\text{integral intensity at 36.2 to 34.5 ppm})] \times 100$$

The higher α-olefin polymer employed in the present invention preferably exhibits the following characteristics.

Specifically, the polymer is a crystalline resin having a melting point TmD which is defined as a peak top of a peak observed in a melt endothermic curve obtained from a sample of the crystalline resin which has been maintained at −10° C. for five minutes and heated to 190° C. at 10° C./min under nitrogen, and, the crystalline resin shows a single peak, and has a melting point Tm of 20 to 100° C., preferably 25 to 70° C., more preferably 30 to 60° C., wherein the melting point Tm is defined as a peak top of the single peak observed in a melt endothermic curve obtained from the sample which has been maintained at 190° C. for five minutes, cooled to −10° C. at 5° C./min, maintained at −10° C. for five minutes, and heated to 190° C. at 10° C./min, the two melting points being measured by means of a differential scanning calorimeter (DSC).

Observation of a "single peak" means that no other peaks and shoulders are observed.

The fusion peak half-width Wm (° C.), which is defined as the width of a peak at the mid point in height between the base line of the fusion peak observed in the Tm measurement and the peak top, is preferably 7° C. or less, more preferably 6° C. or less, still more preferably 5° C. or less, particularly preferably 2 to 4° C.

The weight average molecular weight (Mw) of the higher olefin polymer, determined through gel permeation chromatography (GPC) as reduced to polystyrene, is 1,000 to 10,000,000, preferably 10,000 to 5,000,000, more preferably 150,000 to 5,000,000, yet more preferably 300,000 to 2,000,000, particularly preferably 300,000 to 1,000,000.

When Mw is less than 1,000, strength of the polymer decreases, whereas when it is in excess of 10,000,000, kneading and molding are difficult.

The molecular weight distribution (Mw/Mn) is 4.0 or less, preferably 3.5 or less, more preferably 3.0 or less, particularly preferably 2.3 or less.

When the Mw/Mn is in excess of 4.0, the molecular weight (composition) distribution is wide, thereby causing impairment in surface characteristics, in particular, stickiness and bleeding, and in thermal stability.

Thus, the Mw/Mn is preferably 3.5 or less, more preferably 3.0 or less, particularly preferably 2.3 or less.

The higher α-olefin polymer employed in the present invention preferably exhibits, in the determination of spin-lattice relaxation time (T1) through solid NMR measurement, a single T1 at a temperature not lower than the melting point of the polymer.

Solid NMR was measured by means of the following solid NMR spectrometer. Through rotational repetition (180'-τ-90' pulse method), spin-lattice relaxation time [T1 (ms)] was measured at the above temperatures.
Apparatus: JNM-MU25 (pulse NMR) spectrometer (product of JEOL)
Nucleus measured: hydrogen ($^1$H)
Measurement frequency: 25 MHz
90° pulse width: 2.0 μs Generally, even when a crystalline polymer has in the system thereof a crystalline phase and an amorphous phase, if spin diffusion between the phases occurs at high speed under the melting point of the polymer, relaxation is averaged, whereby a single T1 is observed.

However, when the interphase spin diffusion speed decreases by melting or other reasons, a plurality of T1s may be observed.

Such T1s may be observed in the case where the crystal size is large due to lack of uniformity of the system, or where the crystal size is varied.

In other words, the fact that only a single T1 is observed at a temperature not lower than the melting point means that the system is uniform, the crystal size is small, with a narrow size distribution profile.

The objects of the present invention can be attained by a uniform system with a small crystal size.

The higher α-olefin polymer employed in the present invention preferably exhibits, in the measurement of wide angle X-ray scattering intensity distribution, a single peak X1 attributed to crystallization of side chains at 15°<2θ<30°.

The objects of the present invention can be attained by a uniform system with the thus-observed single peak.

In the X-ray intensity distribution profile, when a peak attributed to a crystalline side chain is not observed, or when a plurality of peaks attributed to a crystalline side chain are observed, the crystalline component exhibits a broad peak. In this case, strength of the polymer decreases, and a sharp fusion peak cannot be obtained. Thus, the objects of the present invention are difficult to attain.

Notably, the wide angle X-ray scattering intensity distribution may be measured through the following procedure.

An anti-cathode Rotaflex RU-200 (product of Rigaku Denki Co., Ltd.) is employed. Monochromatic CuKα radiation (wavelength: 1.54 Å, output: 30 kV, 100 mA) is collimated by means of a pinhole (φ: 2 mm), and wide angle X-ray scattering intensity (WAXS) distribution is measured by means of a site-response-type proportional counter for an exposure time of one minute.

The higher α-olefin polymer employed in the present invention may be produced in the presence of a metallocene catalyst shown hereinbelow. Among metallocene compounds, $C_2$ symmetric and $C_1$ symmetric transition metal compounds which realize synthesis of isotactic polymers are particularly preferably employed.

Specifically, a C≧10 higher α-olefin is polymerized in the presence of a polymerization catalyst containing (a) a transition metal compound and (b) at lease one member selected from (b-1) a compound which reacts with the transition metal compound of component (a) or a derivative thereof to thereby form an ionic complex and (b-2) aluminoxane, the transition metal compound (a) being represented by formula (I):

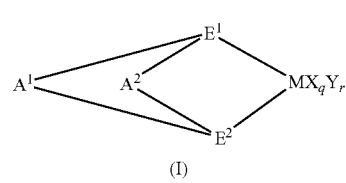

[F1]

(I)

(wherein M represents a metal element belonging to group 3 to group 10 in the periodic table or the lanthanide series; $E^1$ and $E^2$, which may be identical to or different from each other, each represent a ligand selected from among a substituted cyclopentadienyl group, an indenyl group, a substituted indenyl group, a heterocyclopentadienyl group, a substituted heterocyclopentadienyl group, an amido group, a phosphido group, and a hydrocarbon group, and a silicon-containing group, and form a cross-linking structure by the mediation of $A^1$ and $A^2$; X represents a σ-bonding ligand; when a plurality of Xs are present, these groups may be identical to or different from on another, and one X may be cross-linked with another X, $E^1$, $E^2$, or Y; Y represents a Lewis base; when a plurality of Ys are present, these groups may be identical to or different from on another, and one Y may be cross-linked with another Y, $E^1$, $E^2$, or X; $A^1$ and $A^2$, which may be identical to or different from each other, each represent a divalent cross-linking group for linking two ligands; i.e., a C1 to C20 hydrocarbon group, a C1 to C20 halohydrocarbon, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—; R$^1$ represents a hydrogen atom, a halogen atom, a C1 to C20 hydrocarbon group, or a C1 to C20 halohydrocarbon group; q is an integer of 1 to 5 [(atomic valence of M)-2]; and r is an integer of 0 to 3).

In formula (I), M represents a metal element belonging to group 3 to group 10 in the periodic table or the lanthanide series. Examples of the metal element include titanium, zirconium, hafnium, yttrium, vanadium, chromium, manganese, nickel, cobalt, palladium, and lanthanides. Of these, titanium, zirconium, and hafnium are preferred from the viewpoint of olefin polymerization activity and other factors.

$E^1$ and $E^2$ each represent a ligand selected from among a substituted cyclopentadienyl group, an indenyl group, a substituted indenyl group, a heterocyclopentadienyl group, a substituted heterocyclopentadienyl group, an amido group (—N<), a phosphine group (—P<), and a hydrocarbon group (>CR—, >C<), and a silicon-containing group (>SiR—, >Si<, wherein R represents hydrogen, a C1 to C20 hydrocarbon group or a hetero atom-containing group), and form a cross-linking structure by the mediation of $A^1$ and $A^2$.

$E^1$ and $E^2$ may be identical to or different from each other. $E^1$ and $E^2$ are preferably a substituted cyclopentadienyl group, an indenyl group, or a substituted indenyl group.

X represents a σ-bonding ligand. When a plurality of Xs are present, these groups may be identical to or different from on another, and one X may be cross-linked with another X, $E^1$, $E^2$, or Y.

Specific examples of X include a halogen atom, a C1 to C20 hydrocarbon group, a C1 to C20 alkoxy group, a C6 to C20 aryloxy group, a C1 to C20 amido group, a C1 to C20 silicon-containing group, a C1 to C20 phosphido group, a C1 to C20 sulfido group, and a C1 to C20 acyl group.

Y represents a Lewis base. When a plurality of Ys are present, these groups may be identical to or different from on another, and one Y may be cross-linked with another Y, $E^1$, $E^2$, or X.

Specific examples of the Lewis base (Y) include amines, ethers, phosphines, and thioethers.

$A^1$ and $A^2$, which may be identical to or different from each other, each represent a divalent cross-linking group for linking two ligands; i.e., a C1 to C20 hydrocarbon group, a C1 to C20 halohydrocarbon, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein $R^1$ represents a hydrogen atom, a halogen atom, a C1 to C20 hydrocarbon group, or a C1 to C20 halohydrocarbon group.

Examples of the cross-linking group includes groups represented by the following formula:

[F2]

$$\left(\begin{array}{c} D \\ R^2 \diagup \diagdown R^3 \end{array}\right)_e$$

(wherein D represents carbon, silicon, germanium, or tin; $R^2$ and $R^3$, which may be identical to or different from each other, each represent a hydrogen atom or a C1 to C20 hydrocarbon group and may be linked to form a ring structure; and e is an integer of 1 to 4). Specific examples include methylene, ethylene, ethylidene, propylidene, isopropylidene, cyclohexylidene, 1,2-cyclohexylene, vinylidene (CH$_2$=C=), dimethylsilylene, diphenylsilylene, methylphenylsilylene, dimethylgermylene, dimethylstannylene, tetramethyldisilylene, and diphenyldisilylene.

Of these, ethylene, isopropylidene, and dimethylsilylene are preferred.

The "q" is an integer of 1 to 5 [(valence of M)-2], and r is an integer of 0 to 3.

Among transition metal compounds represented by formula (I), preferred are transition metal compound having, as a ligand, a double-cross-linked biscyclopentadienyl derivative represented by formula (II):

[F3]

(II)

(wherein M, $A^1$, $A^2$, q, and r have the same meanings as defined in relation to formula (I)).

$X^1$ represents a 1-bonding ligand. When a plurality of $X^1$s are present, these groups may be identical to or different from on another, and one $X^1$ may be cross-linked with another $X^1$ or $Y^1$.

Specific examples of $X^1$ are the same as exemplified in relation to X in formula (I).

$Y^1$ represents a Lewis base. When a plurality of $Y^1$s are present, these groups may be identical to or different from on another, and one $Y^1$ may be cross-linked with another $Y^1$ or $X^1$.

Specific examples of $Y^1$ are the same as exemplified in relation to Y in formula (I).

Each of $R^4$ to $R^9$ represents a hydrogen atom, a halogen atom, a C1 to C20 hydrocarbon group, a C1 to C20 halohydrocarbon group, a silicon-containing group, or a heteroatom-containing group, provided that at least one group is a non-hydrogen atom.

$R^4$ to $R^9$ may be identical to or different from one another and, adjacent groups among the groups may be linked to form a ring structure.

Preferably, $R^6$ and $R^7$, or $R^8$ and $R^9$ form a ring.

Each of $R^4$ and $R^5$ is preferably a group having a heteroatom such as oxygen, halogen, or silicon, since such a group enhances polymerization activity.

The transition metal compound having, as a ligand, a double-cross-linked biscyclopentadienyl derivative preferably contain silicon in a cross-linking group between ligands.

Specific examples of the transition metal compound represented by formula (I) include (1,2'-ethylene) (2,1'-ethylene)-bis(indenyl)zirconium dichloride, (1,2'-methylene) (2,1'-methylene)-bis(indenyl)zirconium dichloride, (1,2'-isopropylidene) (2,1'-isopropylidene)-bis(indenyl)zirconium dichloride, (1,2'-ethylene) (2,1'-ethylene)-bis(3-methylindenyl)zirconium dichloride, (1,2'-ethylene) (2,1'-ethylene)-bis(4,5-benzoindenyl)zirconium dichloride, (1,2'-ethylene) (2,1'-ethylene)-bis(4-isopropylindenyl)zirconium dichloride, (1,2'-ethylene) (2,1'-ethylene)-bis(5,6-dimethylindenyl)zirconium dichloride, (1,2'-ethylene) (2,1'-ethylene)-bis(4,7-diisopropylindenyl)zirconium dichloride, (1,2'-ethylene) (2,1'-ethylene)-bis(4-phenylindenyl)zirconium dichloride, (1,2'-ethylene) (2,1'-ethylene)-bis(3-methyl-4-isopropylindenyl)zirconium dichloride, (1,2'-ethylene) (2,1'-ethylene)-bis(5,6-benzoindenyl)zirconium dichloride, (1,2'-ethylene) (2,1'-isopropylidene)-bis(indenyl)zirconium dichloride, (1,2'-methylene) (2,1'-ethylene)-bis(indenyl)zirconium dichloride, (1,2'-methylene) (2,1'-isopropylidene)-bis(indenyl)zirconium dichloride, (1,2'-dimethylsilylene) (2,1'-dimethylsilylene)bis(indenyl)zirconium dichloride, (1,2'-dimethylsilylene) (2,1'-dimethylsilylene)bis(3-methylindenyl)zirconium dichloride, (1,2'-dimethylsilylene) (2,1'-dimethylsilylene)bis(3-n-butylindenyl)zirconium dichloride, (1,2'-dimethylsilylene) (2,1'-dimethylsilylene)bis(3-isopropylindenyl)zirconium dichloride, (1,2'-dimethylsilylene) (2,1'-dimethylsilylene)bis(3-trimethylsilylmethylindenyl)zirconium dichloride, (1,2'-dimethylsilylene) (2,1'-dimethylsilylene)bis(3-phenylindenyl)zirconium dichloride, (1,2'-dimethylsilylene) (2,1'-dimethylsilylene)bis(4,5-benzoindenyl)zirconium dichloride, (1,2'-dimethylsilylene) (2,1'-dimethylsilylene)bis(4-isopropylindenyl)zirconium dichloride, (1,2'-dimethylsilylene) (2,1'-dimethylsilylene)bis(5,6-dimethylindenyl)zirconium dichloride, (1,2'-dimethylsilylene) (2,1'-dimethylsilylene)bis(4,7-di-isopropylindenyl)zirconium dichloride, (1,2'-dimethylsilylene) (2,1'-dimethylsilylene)bis(4-phenylindenyl)zirconium dichloride, (1,2'-dimethylsilylene) (2,1'-dimethylsilylene)bis(3-methyl-4-isopropylindenyl)zirconium dichloride, (1,2'-dimethylsilylene) (2,1'-dimethylsilylene)bis(5,6-benzoindenyl)zirconium dichloride, (1,2'-dimethylsilylene) (2,1'-isopropylidene)-bis(indenyl)zirconium dichloride, (1,2'-dimethylsilylene) (2,1'-isopropylidene)-bis(3-methylindenyl)zirconium dichloride, (1,2'-dimethylsilylene) (2,1'-isopropylidene)-bis(3-isopropylindenyl)zirconium dichloride, (1,2'-dimethylsilylene) (2,1'-isopropylidene)-bis(3-n-butylindenyl)zirconium dichloride, (1,2'-dimethylsilylene) (2,1'-isopropylidene)-bis(3-trimethylsilylmethylindenyl)zirconium dichloride, (1,2'-dimethylsilylene) (2,1'-isopropylidene)-bis(3-trimethylsilylindenyl)zirconium dichloride, (1,2'-dimethylsilylene) (2,1'-isopropylidene)-bis(3-phenylindenyl)zirconium dichloride, (1,2'-dimethylsilylene) (2,1'-methylene)-bis(indenyl)zirconium dichloride, (1,2'-dimethylsilylene) (2,1'-methylene)-bis(3-methylindenyl)zirconium dichloride, (1,2'-dimethylsilylene) (2,1'-methylene)-bis(3-isopropylindenyl)zirconium dichloride, (1,2'-dimethylsilylene) (2,1'-methylene)-bis(3-n-butylindenyl)zirconium dichloride, (1,2'-dimethylsilylene) (2,1'-methylene)-bis(3-trimethylsilylmethylindenyl)zirconium dichloride, (1,2'-dimethylsilylene) (2,1'-methylene)-bis(3-trimethylsilylindenyl)zirconium dichloride, (1,2'-diphenylsilylene) (2,1'-methylene)-bis(indenyl)zirconium dichloride, (1,2'-diphenylsilylene) (2,1'-methylene)-bis(3-methylindenyl)zirconium dichloride, (1,2'-diphenylsilylene) (2,1'-methylene)-bis(3-isopropylindenyl)zirconium dichloride, (1,2'-diphenylsilylene) (2,1'-methylene)-bis(3-n-butylindenyl)zirconium dichloride, (1,2'-diphenylsilylene) (2,1'-methylene)-bis(3-trimethylsilylmethylindenyl)zirconium dichloride, (1,2'-diphenylsilylene) (2,1'-methylene)-bis(3-trimethylsilylindenyl)zirconium dichloride, (1,2'-dimethylsilylene) (2,1'-dimethylsilylene) (3-methylcyclopentadienyl) (3'-methylcyclopentadienyl)zirconium dichloride, (1,2'-dimethylsilylene) (2,1'-isopropylidene) (3-methylcyclopentadienyl) (3'-methylcyclopentadienyl)zirconium dichloride, (1,2'-dimethylsilylene) (2,1'-ethylene) (3-methylcyclopentadienyl) (3'-methylcyclopentadienyl)zirconium dichloride, (1,2'-ethylene) (2,1'-methylene) (3-methylcyclopentadienyl) (3'-methylcyclopentadienyl)zirconium dichloride, (1,2'-ethylene) (2,1'-isopropylidene) (3-methylcyclopentadienyl) (3'-methylcyclopentadienyl)zirconium dichloride, (1,2'-methylene) (2,1'-methylene) (3-methylcyclopentadienyl) (3'-methylcyclopentadienyl)zirconium dichloride, (1,2'-methylene) (2,1'-isopropylidene) (3-methylcyclopentadienyl) (3'-methylcyclopentadienyl)zirconium dichloride, (1,2'-isopropylidene) (2,1'-isopropylidene) (3-methylcyclopentadienyl) (3'-methylcyclopentadienyl)zirconium dichloride, (1,2'-dimethylsilylene) (2,1'-dimethylsilylene) (3,4-dimethylcyclopentadienyl) (3',4'-dimethylcyclopentadienyl)zirconium dichloride, (1,2'-dimethylsilylene) (2,1'-isopropylidene) (3,4-dimethylcyclopentadienyl) (3',4'-dimethylcyclopentadienyl)zirconium dichloride, (1,2'-dimethylsilylene) (2,1'-ethylene) (3,4-dimethylcyclopentadienyl) (3',4'-dimethylcyclopentadienyl)zirconium dichloride, (1,2'-ethylene) (2,1'-methylene) (3,4-dimethylcyclopentadienyl) (3',4'-dimethylcyclopentadienyl)zirconium dichloride, (1,2'-ethylene) (2,1'-isopropylidene) (3,4-dimethylcyclopentadienyl) (3',4'-dimethylcyclopentadienyl)zirconium dichloride, (1,2'-methylene) (2,1'-methylene) (3,4-dimethylcyclopentadienyl) (3',4'-dimethylcyclopentadienyl)zirconium dichloride, (1,2'-methylene) (2,1'-isopropylidene) (3,4-dimethylcyclopentadienyl) (3',4'-dimethylcyclopentadienyl)zirconium dichloride, (1,2'-isopropylidene) (2,1'-isopropylidene) (3,4-dimethylcyclopentadienyl) (3',4'-dimethylcyclopentadienyl)zirconium dichloride, (1,2'-dimethylsilylene) (2,1'-dimethylsilylene) (3-methyl-5-ethylcyclopentadienyl) (3'-methyl-5'-ethylcyclopentadienyl)zirconium dichloride, (1,2'-dimethylsilylene) (2,1'-dimethylsilylene) (3-methyl-5-ethylcyclopentadienyl) (3'-methyl-5'-ethylcyclopentadienyl) zirconium dichloride, (1,2'-dimethylsilylene) (2,1'-dimethylsilylene) (3-methyl-5-isopropylcyclopentadienyl) (3'-methyl-5'-isopropylcyclopentadienyl)zirconium dichloride, (1,2'-dimethylsilylene) (2,1'-dimethylsilylene) (3-methyl-5-n-butylcyclopentadienyl) (3'-methyl-5'-n-butylcyclopentadienyl)zirconium dichloride, (1,2'-dimethylsilylene) (2,1'-dimethylsilylene) (3-methyl-5-phenylcyclopentadienyl) (3'-methyl-5'-phenylcyclopentadienyl)zirconium dichloride, (1,2'-dimethylsilylene) (2,1'-isopropylidene) (3-methyl-5-ethylcyclopentadienyl) (3'-methyl-5'-ethylcyclopentadienyl)zirconium dichloride, (1,2'-dimethylsilylene) (2,1'-isopropylidene) (3-methyl-5-isopropylcyclopentadienyl) (3'-methyl-5'-isopropylcyclopentadienyl)zirconium dichloride, (1,2'-dimethylsilylene) (2,1'-isopropylidene) (3-methyl-5-n-butylcyclopentadienyl) (3'-methyl-5'-n-butylcyclopentadienyl)zirconium dichloride, (1,2'-dimethylsilylene) (2,1'-isopropylidene) (3-methyl-5-phenylcyclopentadienyl) (3'-methyl-5'-phenylcyclopentadienyl)zirconium dichloride, (1,2'-dimethylsilylene) (2,1'-ethylene) (3-methyl-5-ethylcyclopentadienyl) (3'-methyl-5'-ethylcyclopentadienyl)zirconium dichloride, (1,2'-dimethylsilylene) (2,1'-ethylene) (3-methyl-5-isopropylcyclopentadienyl) (3'-methyl-5'-isopropylcyclopentadienyl)zirconium dichloride, (1,2'-dimethylsilylene) (2,1'-ethylene) (3-methyl-5-n-butylcyclopentadienyl) (3'-methyl-5'-n-butylcyclopentadienyl)zirconium dichloride, (1,2'-dimethylsilylene) (2,1'-ethylene) (3-methyl-5-phenylcyclopentadienyl) (3'-methyl-5'-phenylcyclopentadienyl)zirconium dichloride, (1,2'-dimethylsilylene) (2,1'-methylene) (3-methyl-5-ethylcyclopentadienyl) (3'-methyl-5'-ethylcyclopentadienyl)zirconium dichloride, (1,2'-dimethylsilylene) (2,1'-methylene) (3-methyl-5-isopropylcyclopentadienyl) (3'-methyl-5'-isopropylcyclopentadienyl)zirconium dichloride, (1,2'-dimethylsilylene) (2,1'-methylene) (3-methyl-5-n-butylcyclopentadienyl) (3'-methyl-5'-n-butylcyclopentadienyl)zirconium dichloride, (1,2'-dimethylsilylene) (2,1'-methylene) (3-methyl-5-phenylcyclopentadienyl) (3'-methyl-5'-phenylcyclopentadienyl)zirconium dichloride, (1,2'-ethylene) (2,1'-methylene) (3-methyl-5-isopropylcyclopentadienyl) (3'-methyl-5'-isopropylcyclopentadienyl)zirconium dichloride, (1,2'-ethylene) (2,1'-isopropylidene) (3-methyl-5-isopropylcyclopentadienyl) (3'-methyl-5'-isopropylcyclopentadienyl)zirconium dichloride, (1,2'-methylene) (2,1'-methylene) (3-methyl-5-isopropylcyclopentadienyl) (3'-methyl-5'-isopropylcyclopentadienyl)zirconium dichloride, (1,2'-methylene) (2,1'-isopropylidene) (3-methyl-5-isopropylcyclopentadienyl) (3'-methyl-5'-isopropylcyclopentadienyl)zirconium dichloride, (1,1'-dimethylsilylene) (2,2'-dimethylsilylene)bisindenylzirconium dichloride, (1,1'-diphenylsilylene) (2,2'-dimethylsilylene) bisindenylzirconium dichloride, (1,1'-dimethylsilylene) (2,2'-dimethylsilylene)bisindenylzirconium dichloride, (1,1'-diisopropylsilylene) (2,2'-dimethylsilylene)bisindenylzirconium dichloride, (1,1'-dimethylsilylene) (2,2'-diisopropylsilylene)bisindenylzirconium dichloride, (1,1'-dimethylsilyleneindenyl) (2,2'-dimethylsilylene-3-trimethylsilylindenyl)zirconium dichloride, (1,1'-diphenylsilyleneindenyl) (2,2'-diphenylsilylene-3-trimethylsilylindenyl)zirconium dichloride, (1,1'-diphenylsilyleneindenyl) (2,2'-dimethylsilylene-3- trimethylsilylindenyl)zirconium dichloride, (1,1'-dimethylsilylene) (2,2'-dimethylsilylene) (indenyl) (3-trimethylsilylindenyl)zirconium dichloride, (1,1'-diphenylsilylene) (2,2'-diphenylsilylene) (indenyl) (3-trimethylsilylindenyl)zirconium dichloride, (1,1'-diphenylsilylene) (2,2'-dimethylsilylene) (indenyl) (3-trimethylsilylindenyl)zirconium dichloride, (1,1'-dimethylsilylene) (2,2'-diphenylsilylene) (indenyl) (3-trimethylsilylindenyl)zirconium dichloride, (1,1'-diisopropylsilylene) (2,2'-dimethylsilylene) (indenyl) (3-trimethylsilylindenyl)zirconium dichloride, (1,1'-dimethylsilylene) (2,2'-diisopropylsilylene) (indenyl) (3-trimethylsilylindenyl)zirconium dichloride, (1,1'-diisopropylsilylene) (2,2'-diisopropylsilylene) (indenyl) (3-trimethylsilylindenyl)zirconium dichloride, (1,1'-dimethylsilylene) (2,2'-dimethylsilylene) (indenyl) (3-trimethylsilylmethylindenyl)zirconium dichloride, (1,1'-diphenylsilylene) (2,2'-diphenylsilylene) (indenyl) (3-trimethylsilylmethylindenyl)zirconium dichloride, (1,1'-diphenylsilylene) (2,2'-dimethylsilylene) (indenyl) (3-trimethylsilylmethylindenyl)zirconium dichloride, (1,1'-dimethylsilylene) (2,2'-diphenylsilylene) (indenyl) (3-trimethylsilylmethylindenyl)zirconium dichloride, (1,1'-diisopropylsilylene) (2,2'-dimethylsilylene) (indenyl) (3-trimethylsilylmethylindenyl)zirconium dichloride, (1,1'-dimethylsilylene) (2,2'-diisopropylsilylene) (indenyl) (3-trimethylsilylmethylindenyl)zirconium dichloride, (1,1'-diisopropylsilylene) (2,2'-diisopropylsilylene) (indenyl) (3-trimethylsilylmethylindenyl)zirconium dichloride, titanium-substituted species thereof, and hafnium-substituted species thereof. Needless to say, the transition metal compound is not limited to the above species.

Alternatively, analogous compounds of a metal of another group or of a lanthanide may be employed.

In the above compounds, (1,1'-) (2,2'-) may be replaced by (1,2'-) (2,1'-), and (1,2'-) (2,1'-) may be replaced by (1,1'-) (2,2'-).

No particular limitation is imposed on the component (b-1) of the component (b), and any compound may be used so long as the compound reacts with the transition metal compound of component (a) to thereby form an ionic complex. Preferably employed are the following compounds represented by formula (III) or (IV):

$$([L^1-R^{10}]^{k+})_a([Z]^-)_b \quad (III)$$

$$([L^2]^{k+})([Z]^-)_b \quad (IV)$$

(wherein $L^2$ represents M2, $R^{11}R^{12}M^3$, $R^{13}_3C$, or $R^{14}M^3$; $L^1$ represents a Lewis base; $[Z]^-$ represents a non-coordinating anion $[Z^1]^-$ or $[Z^2]^-$, wherein $[Z^1]^-$ represents an anion in which a plurality of groups are bonded to the element; i.e., $[M^1G^1G^2 \ldots G^f]^-$ (wherein $M^1$ represents a Group 5 to 15 element, preferably a Group 13 to 15 element; each of $G^1$ to $G^f$ represents a hydrogen atom, a halogen atom, a C1 to C20 alkyl group, C2 to C40 dialkylamino group, a C1 to C20 alkoxy group, a C6 to C20 aryl group, a C6 to C20 aryloxy group, a C7 to C40 alkylaryl group, a C7 to C40 arylalkyl group, a C1 to C20 halohydrocarbon group, a C1 to C20 acyloxy group, an organic metalloid group, or a C2 to C20 heteroatom-containing hydrocarbon group; two or more groups of $G^1$ to $G^f$ may form a ring; and f is an integer of [(valence of center metal $M^1$+1]); $[Z^2]^-$ represents a Broensted acid having a pKa (logarithm of reciprocal acid dissociation constant) of −10 or less, a conjugated base of the Brønsted acid and a Lewis acid, or a conjugated base of the Brønsted acid and an acid generally defined as a hyperstrong acid; the Lewis base may be coordinated; $R^{10}$ represents a hydrogen atom, a C1 to C20 alkyl group, a C6 to C20 aryl group, an alkylaryl group, or an arylalkyl group; each of $R^{11}$ and $R^{12}$ represents a cyclopentadienyl group, a substituted cyclopentadienyl group, an indenyl group, or a fluorenyl group; $R^{13}$ represents a C1 to C20 alkyl group, an aryl group, an alkylaryl group, or an arylalkyl group; $R^{14}$ represents a macrocyclic ligand such as tetraphenylporphyrin or phthalocyanine; k represents an ionic valence of $[L^1-R^{10}]$ or $[L^2]$ and an integer of 1 to 3; a is an integer of 1 or more; b is (k×a); $M^2$ is an element including a Group 1 to 3, 11 to 13, or 17 element; and $M^3$ represents a Group 7 to 12 element).

Specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, and p-nitro-N,N-dimethylaniline; phosphines such as triethylphosphine, triphenylphosphine, and diphenylphosphine; thioethers such as tetrahydrothiophene; esters such as ethyl benzoate; and nitriles such as acetonitrile and benzonitrile.

Specific examples of $R^{10}$ include hydrogen, methyl, ethyl, benzyl, and trityl. Specific examples of $R^{11}$ and $R^{12}$ include cyclopentadienyl, methylcyclopentadienyl, ethylcyclopentadienyl, and pentamethylcyclopentadienyl.

Specific examples of $R^{13}$ include phenyl, p-tolyl, and p-methoxyphenyl. Specific examples of $R^{14}$ include tetraphenylporphyrin, phthalocyanine, aryl, and methacryl.

Specific examples of $M^2$ include $L^1$, Na, K, Ag, Cu, Br, I, and $I_3$. Specific examples of $M^3$ include Mn, Fe, Co, Ni, and Zn.

In $[Z^1]^-$; i.e., $[M^1G^1G^2 \ldots G^f]$, specific examples of $M^1$ include B, Al, Si, P, As, and Sb. Among them, B and Al are preferred.

Specific examples of $G^1$, $G^2$ to $G^f$ include dialkylamino groups such as dimethylamino, diethylamino and the like; alkoxy or aryloxy groups such as methoxy, ethoxy, n-butoxy, phenoxy and the like; hydrocarbon groups such as methyl, ethyl, n-propyl, isopropyl, n-butyl, isobutyl, n-octyl, n-eicosyl, phenyl, p-tolyl, benzyl, 4-t-butylphenyl, 3,5-dimethylphenyl and the like; halogen atoms such as fluorine, chlorine, bromine and iodine; heteroatom-containing hydrocarbon groups such as p-fluorophenyl, 3,5-difluorophenyl, pentachlorophenyl, 3,4,5-trifluorophenyl, pentafluorophenyl, 3,5-bis(trifluoromethyl)phenyl, bis(trimethylsilyl)methyl and the like; and organic metalloid groups such as a pentamethylantimony group, trimethylsilyl, trimethylgermyl, a diphenylarsine, a dicyclohexylantimony group, diphenylborate and the like.

Specific examples of the non-coordinating anion $[Z^2]^-$; i.e., the Brønsted acid having a pKa of −10 or less or the conjugated base of the Brønsted acid and a Lewis acid, include trifluoromethanesulfonate anion $(CF_3SO_3)^-$, bis(trifluoromethanesulfonyl)methyl anion, bis(trifluoromethanesulfonyl)benzyl anion, bis(trifluoromethanesulfonyl)amido, perchlorate anion $(ClO_4)^-$, trifluoroacetate anion $(CF_3CO_2)^-$, hexafluoroantimony anion $(SbF_6)^-$, fluorosulfonate anion $(FSO_3)^-$, chlorosulfonate anion $(ClSO_3)^-$, fluorosulfonate anion/antimony pentafluoride $(FSO_3/SbF_5)^-$, fluorosulfonate anion/arsenic pentafluoride $(FSO_3/AsF_5)^-$, and trifluoromethanesulfonate/antimony pentafluoride $(CF_3SO_3/SbF_5)^-$.

Specific examples of the compound which reacts with the transition metal compound (a) to thereby form an ionic complex; i.e., the compound of component (b-1), include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl) borate, methyldiphenylammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate, silver trifluoromethanesulfonate and the like.

These (b-1) compounds may be used singly or in combination of two or more species.

Examples of the component (b-2), alminoxane, include chain alminoxanes represented by formula (V):

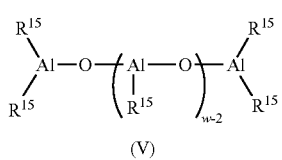

(V)

(wherein $R^{15}$ represents a halogen atom or a hydrocarbon group such as a C1 to C20, preferably C1 to C12 alkyl group, an alkenyl group, an aryl group, or an arylalkyl group; w represents an average polymerization degree and is an integer of generally 2 to 50, preferably 2 to 40, and a plurality of $R^{15}$s may be identical to or different from one another), and cyclic alminoxanes represented by formula (VI):

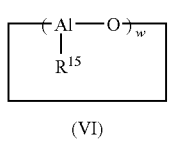

(VI)

(wherein $R^{15}$ and w have the same meanings as defined in formula (V)).

No particular limitation is imposed on the method for producing the aluminoxanes, and there may be employed, for example, a production method including bringing alkylaluminum into contact with a condensing agent such as water. Reaction in the production method may be performed in accordance with a known technique.

Examples of the reaction include method (1) including dissolving an organic aluminum compound in an organic solvent and bringing the solution into contact with water; method (2) including adding first an organic aluminum compound during polymerization and adding water thereafter; method (3) including reacting an organic aluminum compound with water contained in a metallic salt such as crystallization water or adsorbed by inorganic or organic substances; and method (4) including reacting tetraalkyldialuminoxane with trialkylaluminum and further reacting with water.

The aluminoxanes may be insoluble in toluene.

These aluminoxanes may be used singly or in combination of two or more species.

The ratio by mole of catalyst component (a) to catalyst component (b), when (b-1) is employed as catalyst component (b), is preferably 10:1 to 1:100, more preferably 2:1 to 1:10. When the ratio falls outside the range, cost of the catalyst with respect to the unit mass of the polymer increases, which is not preferred in practice.

When compound (b-2) is employed as catalyst component (b), the ratio by mole is preferably 1:1 to 1:1,000,000, more preferably 1:10 to 1:10,000.

When the ratio falls outside the range, cost of the catalyst with respect to the unit mass of the polymer increases, which is not preferred in practice.

In the catalyst component (b), (b-1) and (b-2) may be used singly or in combination of two or more species.

In addition to the aforementioned components (a) and (b) of the polymerization catalyst for producing the higher α-olefin polymer of the present invention, an organic aluminum compound may be employed as component (c).

The organic aluminum compound serving as component (c) is a compound represented by formula (VII):

$$R^{16}_v AlJ_{3-v} \qquad (VII)$$

(wherein $R^{16}$ represents a C1 to C10 alkyl group; J represents a hydrogen atom, a C1 to C20 alkoxy group, a C6 to C20 aryl group, or a halogen atom; v is an integer of 1 to 3).

Specific examples of the compound represented by formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride and the like.

These organic aluminum compounds may be used singly or in combination of two or more species.

The molar ratio of catalyst component (a) to catalyst component (c) is preferably 1:1 to 1:10,000, more preferably 1:5 to 1:2000, yet more preferably 1:10 to 1:1,000.

Through employment of the catalyst component (c), polymerization activity with respect to the unit amount of transition metal can be enhanced. However, if the catalyst component (c) is used in an excessive amount, the organic aluminum compound does not effectively function, and a large amount of the compound remains in the polymer, which is not preferred.

In the production of the higher α-olefin polymer of the present invention, at least one catalyst component may be held on an appropriate carrier.

No particular limitation is imposed on the type of the carrier, and any of inorganic oxide carriers, carriers of other inorganic compounds, and organic carriers may be employed.

Among them, inorganic oxide carriers and carriers of other inorganic compounds are particularly preferred.

Specific examples of inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$, and mixtures thereof such as silica-alumina, zeolite, ferrite, and glass fiber.

Of these, $SiO_2$ and $Al_2O_3$ are particularly preferred.

The aforementioned inorganic oxide carriers may contain a carbonate salt, a nitrate salt, a sulfate salt, etc., in a small amount.

Other than the aforementioned carries, magnesium compounds represented by formula $MgR^{17}{}_xX^1{}_y$ (typical examples including $MgCl_2$ and $Mg(OC_2H_5)_2$) or complex salts thereof may also be employed.

In the above formula, $R^{17}$ represents a C1 to C20 alkyl group, a C1 to C20 alkoxy group, or a C6 to C20 aryl group; $X^1$ represents a halogen atom or a C1 to C20 alkyl group; x is 0 to 2; and y is 0 to 2 (x+y=2).

A plurality of $R^{17}$ or $X^1$ may be identical to or different from one another.

Examples of organic carriers include polymers such as polystyrene, styrene-divinylbenzene copolymer, polyethylene, poly-1-butene substituted polystyrenes, and polyarylate; and starch; and carbon.

The catalyst carrier employed in the production of the higher α-olefin polymer of the present invention is preferably $MgCl_2$, $MgCl(OC_2H_5)$, $Mg(OC_2H_5)_2$, $SiO_2$, $Al_2O_3$, etc.

Regarding the morphology of the carrier, which varies depending on the type and production method, the mean particle size is generally 1 to 300 μm, preferably 10 to 200 μm, more preferably 20 to 100 μm.

When the particle size is small, a larger amount of micropowder is incorporated into the polymer, whereas when the particle size is large, a larger amount of coarse particles are incorporated into the polymer, which causes a decrease in bulk density and clogging of a hopper.

The carrier generally has a specific surface area of 1 to 1,000 $m^2/g$, preferably 50 to 500 $m^2/g$, and a micropore volume of 0.1 to 5 $cm^3/g$, preferably 0.3 to 3 $cm^3/g$.

When either of the specific surface area or the micropore volume falls outside the corresponding range, catalytic activity may decrease.

The specific surface area and the micropore volume may be determined through, for example, the volume of adsorbed nitrogen gas on the basis of the BET method (see J. Am. Chem. Soc., 60, 309(1983)).

In the case where the carrier is formed of an inorganic oxide, the carrier is preferably fired generally at 150 to 1,000° C., preferably 200 to 800° C., before use thereof.

For causing at least one catalyst component to be carried on the aforementioned carrier, at least one of the catalyst components (a) and (b), preferably, both the catalyst components (a) and (b), are caused to be carried on the carrier.

No particular limitation is imposed on the method for causing at least one of the catalyst components (a) and (b) to be carried on the carrier, and there may be employed, for example, the following methods: method (1) including mixing at least one of the components (a) and (b) with a carrier; method (2) including treating a carrier with an organic aluminum compound or a halogen-containing silicon compound and, subsequently, mixing the thus-treated carrier with at least one of the components (a) and (b) in an inert solvent; method (3) including reacting component (a) and/or component (b) with an organic aluminum compound or a halogen-containing silicon compound; method (4) including causing component (a) or (b) to be carried on a carrier and, subsequently, mixing with component (b) or (a); method (5) including reacting component (a) with component (b) in a contact manner and mixing the reaction product with a carrier; and method (6) reacting component (a) and component (b) in a contact manner in the presence of a carrier.

In the method (4), (5), or (6), an organic aluminum compound serving as component (c) may be added to the reaction system.

The thus-produced catalyst may be collected as solid through removal of the solvent before use in polymerization, or the as-produced catalyst may be used in polymerization without further treatment.

Alternatively, in the production of the higher α-olefin polymer of the present invention, the operation of causing at least one of the components (a) and (b) to be carried on carrier may be performed in the polymerization system, to thereby form a catalyst.

For example, catalyst particles may be formed through a method in which at least one of the components (a) and (b), a carrier, and an optional organic aluminum compound serving as component (c) are mixed, and an olefin such as ethylene is fed to the mixture at ambient pressure to 2 MPa (gauge) for preliminary polymerization at −20 to 200° C. for about one minute to about two hours.

In the catalyst employed for the production of the higher α-olefin polymer of the present invention, the ratio by mass of component (b-1) to the carrier is preferably 1:5 to 1:10,000, more preferably 1:10 to 1:500, and the ratio by mass of component (b-2) to the carrier is preferably 1:0.5 to 1:1,000, more preferably 1:1 to 1:50.

When two or more species are employed in combination as component (b), the ratio by mass of each species of (b) to a carrier preferably falls within the above range.

The ratio by mass of component (a) to a carrier is preferably 1:5 to 1:10,000, more preferably 1:10 to 1:500.

When the ratio of component (b) [components (b-1) or (b-2)] to a carrier, or the ratio of component (a) to a carrier falls outside the corresponding range, catalytic activity may decrease.

The thus-prepared polymerization catalyst generally has a mean particle size of 2 to 200 μm, preferably 10 to 150 μm, particularly preferably 20 to 100 μm, and a specific surface area of 20 to 1,000 $m^2/g$, preferably 50 to 500 $m^2/g$.

When the mean particle size is less than 2 μm, a larger amount of micropowder may be incorporated into the polymer, whereas when the mean particle size is in excess of 200 μm, a larger amount of coarse particles may be incorporated into the polymer.

When the specific surface area is less than 20 $m^2/g$, catalytic activity may decrease, whereas when the specific surface area is in excess of 1,000 $m^2/g$, bulk density of the polymer may decrease.

Generally, in the catalyst employed in production of 1-butene-based polymer, the amount of transition metal in a carrier (100 g) is preferably 0.05 to 10 g, particularly preferably 0.1 to 2 g.

When the transition metal amount falls outside the range, catalytic activity may decrease.

Through forming such a catalyst-on-carrier, an industrially advantageous polymer having high bulk density and exhibiting a suitable particle size distribution profile can be produced.

In the production of the higher α-olefin polymer of the present invention, no particular limitation is imposed on the polymerization method, and any of the methods such as slurry polymerization, vapor phase polymerization, bulk polymerization, solution polymerization, and suspension polymerization. Among them, slurry polymerization and vapor phase polymerization are particularly preferred.

Among polymerization conditions, polymerization temperature is generally −100 to 250° C., preferably −50 to 200° C., more preferably 0 to 130° C.

The ratio of reaction material to catalyst, monomer/component (a) (molar ratio) is preferably 1 to $10^8$, particularly preferably 100 to $10^5$.

Polymerization time is generally five minutes to 10 hours, and reaction pressure is preferably ambient pressure to 20 MPa (gauge), more preferably ambient pressure to 10 MPa (gauge).

In the production of the higher α-olefin polymer of the present invention, addition of hydrogen is preferred from the viewpoint of enhancement in polymerization activity.

When hydrogen is used, the pressure of hydrogen is generally ambient pressure to 5 MPa (gauge), preferably ambient pressure to 3 MPa (gauge), more preferably ambient pressure to 2 MPa (gauge).

A polymerization solvent may be employed. Examples of employable solvents include aromatic hydrocarbons such as benzene, toluene, xylene, and ethylbenzene; alicyclic hydrocarbons such as cyclopentane, cyclohexane, and methylcyclohexane; aliphatic hydrocarbons such as pentane, hexane, heptane, and octane; and halohydrocarbons such as chloroform and dichloromethane.

These solvents may be used singly or in combination of two or more species.

Alternatively, a monomer such as an α-olefin may be employed as a solvent.

Notably, some polymerization methods may be carried out without using solvent.

Upon polymerization, preliminary polymerization may be carried out in the presence of the aforementioned polymerization catalyst.

No particular limitation is imposed on the method of preliminary polymerization, and any known method may be employed. For example, a small amount of olefin is brought into contact with a solid catalyst component.

No particular limitation is imposed on the olefin to be preliminarily polymerized, and the same olefins as exemplified such as ethylene, C3 to C20 α-olefins, and mixtures thereof may be employed. Preferably, use of the same olefin as employed in the polymerization is preferred.

Preliminary polymerization is generally carried out at −20 to 200° C., preferably −10 to 130° C., more preferably 0 to 80° C.

In the preliminary polymerization, an aliphatic hydrocarbon, an aromatic hydrocarbon, a monomer, etc. may be employed as a solvent.

Of these, an aliphatic hydrocarbon is particularly preferred.

Preliminary polymerization may be carried out without using solvent.

In the preliminary polymerization, polymerization conditions are preferably controlled such that a preliminary polymerization product has a limiting viscosity [η] (as measured at 135° C. in decalin) of 0.1 dL/g or more, and the amount of preliminary polymerization product with respect to 1 mmol of transition metal component in the catalyst is adjusted to 1 to 10,000 g, particularly 10 to 1,000 g.

The molecular weight of the polymer may be controlled through selection of type and amount of catalyst components and polymerization temperature, or through polymerization in the presence hydrogen.

In the preliminary polymerization, an inert gas such as nitrogen may be present.

The carbon nanotube (C) employed in the present invention is a hollow fibrous carbon substance preferably having an outer diameter of 0.5 to 120 nm and a length of 500 nm or longer, more preferably an outer diameter of 1 to 100 nm and a length of 800 to 15,000 nm.

When the outer diameter of carbon nanotube is 0.5 nm or more, dispersion of carbon nanotube is facilitated, leading to enhancement in conductive (antistatic) property, whereas when the outer diameter is 120 nm or less, the molded product of the resin composition is excellent, and the conductive (antistatic) property is enhanced.

When the length of carbon nanotube is 500 nm or longer, in particular, 800 nm or longer, a sufficient conductive (antistatic) property can be attained, whereas when the length is 15,000 nm or shorter, the molded product of the resin composition exhibits excellent appearance, and dispersion of the carbon nanotube is facilitated.

The thermoplastic composition of the present invention preferably has an amorphous carbon particle (impurity) content of 20 mass % or less, more preferably 10 mass % or less, from the viewpoint of conductive (antistatic) property and other properties of the thermoplastic composition.

Through controlling the amorphous carbon particle content to 20 mass % or less, the conductive (antistatic) property is enhanced, and aging of the composition during molding can be effectively prevented.

Surface-treated (e.g., acid-treated or oxidized) carbon nanotube to which carboxylic groups or hydroxyl groups have been introduced to the surface thereof can enhance the conductivity of the resin composition.

The amount of introduced functional groups is preferably 0.5 to 10 mass % with respect to the amount of carbon nanotube.

Through incorporation of carbon nanotube into thermoplastic composition 1 of the present invention, the thermoplastic resin/side-chain crystalline polymer phase structure is stabilized, whereby reaggregation of the side-chain crystalline polymer during melting, and domain orientation during injection molding can be mitigated.

Through incorporation of carbon nanotube into thermoplastic composition 2 of the present invention, the composition exhibits high conductivity, and other physical properties and molding appearance are less impaired.

In addition, release of carbon from the composition is prevented. Therefore, when the composition is employed as a conductive product, staining by carbon or carbonaceous material can be prevented. The incorporated carbon impart heat radiation property to the composition.

A variety of known carbon nanotube species and carbon micro-coil species may be employed as the carbon nanotube of the present invention.

The carbon nanotube may be produced through, for example, catalytic chemical vapor deposition (CCVD) employing a iron- or cobalt-based catalyst incorporated into pores of zeolite; chemical vapor deposition (CVD), laser ablation, or the arc discharge method employing carbon rod-carbon fiber or a similar material.

The end shape of carbon nanotube is not necessarily cylindrical. For example, the end shape may be slightly deformed cylindrical such as conical.

The carbon nanotube employed in the invention may have an open end or a closed end. Of the two structures, an open end structure is preferred.

A closed end of carbon nanotube can be opened through chemical treatment with a substance such as nitric acid.

The carbon nanotube may have a multi-layer structure or a single layer structure.

So long as the physical properties of the resin composition of the present invention are not impaired, additives generally employed for resins may be added to the composition during mixing, molding, or other processes. Examples of such additives include pigments, dyes, reinforcing agents, fillers, heat-resisting agents, antioxidants, anti-weathering agents, lubricants, mold-releasing agents, nucleating agents, plasticizers, flow-characteristics-improving agents, and antistatic agents.

An exemplary process for producing the resin composition of the present invention is melt-kneading of components, which is a conventionally known method.

For example, the following melt-kneading process may be appropriately selected. Specifically, components are dispersed and mixed by means of a high-speed mixer such as a tumble mixer, a Henschel mixer, a ribbon blender, or a super-mixer and, subsequently, the mixture is melt-kneaded by means of an extruder, a Banbury mixer, or a roller.

In the process for producing resin composition 1 of the present invention, all the components may be melt-kneaded in a one-batch manner. Alternatively, the side-chain crystalline polymer and carbon nanotube may be melt-kneaded in advance, and the kneaded product is melt-kneaded with thermoplastic resin and other components. The latter process may effectively enhance the conductive (antistatic) property of the composition, and the thermoplastic resin/side-chain crystalline polymer phase structure may be more effectively enhanced.

In one melt-kneading process, thermoplastic resin and other components may be fed, through a port in the extruder, to a melt of the side-chain crystalline polymer and carbon nanotube. Alternatively, a master batch of the side-chain crystalline polymer and carbon nanotube which has been prepared in advance may also be employed.

The master batch preferably has a carbon nanotube content of 5 to 40 mass %.

In one process for producing resin composition 2 of the present invention, 70 to 1 mass % of component (C) is added to 30 to 99 mass % of component (B) which is in a molten state, and the mixture in kneaded, followed by cooling to lower than 40° C., preferably 30° C. or lower, more preferably 20° C. or lower.

Since the resin composition of the present invention has the aforementioned characteristics, the composition is preferably employed for, for example, an OA equipment, an information and communication equipment, an automobile part, or a household electric and electronic equipment.

The present invention also provides a molded product of the aforementioned resin composition.

EXAMPLES

The present invention will next be described in more detail by way of examples, which should not be construed as limiting the invention thereto.

Examples 1 to 5 and Comparative Examples 1 to 3

In each Example, components were mixed at proportions shown in Table 1, and the mixture was fed to a twin-screw vented extruder (model: TEM35, product of Toshiba Machine Co., Ltd.), where the mixture was melt-kneaded at 280° C., to thereby form pellets of the mixture.

The thus-formed pellets were dried at 120° C. for 10 hours, and injection-molded at a molding temperature of 260° C. (mold temperature: 80° C.), to thereby produce test pieces.

The pellets were also molded by means of a mold (dimensions: 80 mm×100 mm×40 mm (depth), thickness 3 mm, and draft angle: 0) under the aforementioned conditions, to thereby yield molded products.

Properties of the thus-produced test pieces and molded products were evaluated through the tests described hereinbelow, and the results are shown in Table 1.

Examples 6 to 9 and Comparative Examples 4 to 7

In each Example, components were mixed at proportions shown in Table 2, and the mixture was fed to a twin-screw vented extruder (model: TEM35, product of Toshiba Machine Co., Ltd.), where the mixture was kneaded at 280° C., to thereby form pellets of the mixture.

The thus-formed pellets were dried at 120° C. for 10 hours, and injection-molded at a molding temperature identical to the temperature employed in measurement of melt index (MI) (see Table 2, mold temperature: 80° C.), to thereby produce test pieces.

The pellets were also molded by means of a mold (dimensions: 80 mm×100 mm×40 mm (depth), thickness 3 mm, and draft angle: 0) under the aforementioned conditions, to thereby yield molded products.

Properties of the thus-produced test pieces and molded products were evaluated through the tests described hereinbelow, and the results are shown in Table 2.

Examples 10 to 13 and Comparative Examples 8 to 10

Carbon nanotube was added in an amount shown in Table 3 to a side-chain crystalline polymer which was in a molten state at 150° C. (oven temperature), and dispersed through agitation. The mixture was cooled to a temperature lower than 20° C. and molded into sheet samples having a thickness of about 1 mm.

Properties of the thus-formed sheet samples were evaluated through the following tests, and the results are shown in Table 3.

The blended components and property evaluation methods are as follows.
(Components Blended)
[Component (A)]
PC: aromatic polycarbonate resin: A1900 [product of Idemitsu Kosan Co., Ltd.], viscosity average molecular weight: 19,500
ABS: acrylonitrile-butadiene-styrene resin: AT-05 [product of Nippon A&L Inc.]
PET: polyethylene terephthalate resin: Dianite MA523 [Mitsubishi Rayon Co., Ltd.]
PPS: polyphenylene sulfide resin: LR2G [product of ICEP]
PPO: polyphenylene oxide resin: Blendex HP820 [product of GE Specialty Chemicals Inc.]
[Component (B)]
Side-chain crystalline polymer A: See Referential Example 1(4).
[Component (C)]
Carbon nanotube 1: multi-wall, diameter: 10 to 30 nm, length 1 to 10 μm, both ends open, amorphous carbon particle content: 10 mass % [product of Sun Nanotech Co., Ltd.]
Carbon nanotube 2: surface-treated multi-wall (carboxyl group: 3 mass %, hydroxyl group: 2 mass %), diameter: 10 to 30 nm, length 5 to 15 μm, both ends open, amorphous carbon particle content: 3 mass % [L-MWNT 1030, product of Shenzhen Nanotech Port Co., Ltd.]
(B)+(C): A master batch of side-chain crystalline polymer A/carbon nanotube MB, and a master batch of carbon nanotube 2 and side-chain crystalline polymer A were mixed by means of a twin-screw extruder (TEM-35) at 150° C., to thereby produce a master batch having a carbon nanotube content of 30 mass %.

CB: carbon black: #3030B [product of Mitsubishi Chemical Co., Ltd.]

CF: carbon fiber: HTAC-6SRS [product of Toho Rayon Co., Ltd.]

[Property Evaluation Methods]

(1) IZOD (Izod impact strength): in accordance with ASTM D256, 23° C. [thickness: 1/8 inches (0.32 cm)], unit: $kJ/m^2$ (2) Volume resistivity: Measured in accordance with JIS K6911 (test sheet: 80×80×3 mm), unit: $\Omega cm$.

(3) MI (melt index): Measured in accordance with JIS-K7210 (load: 21.18 N).

(4) Molding appearance: Visually evaluated.

(5) Mold-releasability: Ejector pin pressure was measured (max. 30 $kg/cm^2$). The smaller the pressure, the more excellent the releasability.

(6) Solvent resistance: Each test piece was immersed in gasoline for 10 minutes. After immersion, the test piece was manually bent, and a change in, for example, appearance of the test piece was observed for evaluation.

(7) Flame retardancy: in accordance with the UL94 burning test (test piece thickness: 1.5 mm)

(8) Carbon adhesion: Cellophane tape was affixed to each test piece and peeled off. The presence of carbon on the peeled surface of the tape was observed.

TABLE 1

| | | | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|
| Composition | PC | mass % | 96.7 | 97 | 90 | 90 | 90 | 100 | 100 | 90 |
| | Side-chain crystalline polymer A | mass % | | 3 | | 10 | 10 | | | 10 |
| | Carbon nanotube 1 | parts by mass | | | 1 | 3 | | | 1 | |
| | Carbon nanotube 2 | parts by mass | | | | | 3 | | | |
| | Side-chain crystalline polymer A/Carbon nanotube MB | mass % | 3.3 | | 10 | | | | | |
| Evaluation | IZOD impact strength ($KJ/m^2$) | | 80 | 70 | 70 | 45 | 55 | 85 | 40 | 15 |
| | Volume resistivity | | 3 × 10E10 | 5 × 10E11 | 70 | 5 × 10E2 | 1 × 10E2 | >10E16 | >10E16 | >10E16 |
| | MI (measured at 260° C.) | | 23 | 24 | 34 | 36 | 33 | 18 | 15 | 40 |
| | Molding appearance | | No problem | No problem | No problem | No problem | No problem | No problem | Silver | Laminar peeling |
| | Release hydropressure | | 22 | 22 | 17 | 16 | 16 | Not released | Not released | 16 |
| | Solvent resistance | | Slight craze | Slight craze | No change | No change | No change | Crack | Crack | No problem |
| | Flame retardancy | 1.5 mm | V-2 | V-2 | V-2 | V-2 | V-2 | V-2 | NG | NG |

TABLE 2

| | | | Ex. 6 | Ex. 7 | Ex. 8 | Ex. 9 | Comp. Ex. 4 | Comp. Ex. 5 | Comp. Ex. 6 | Comp. Ex. 7 |
|---|---|---|---|---|---|---|---|---|---|---|
| Composition | Thermoplastic resin | mass % | ABS 96.7 | PET 96.7 | PPS 96.7 | PPO 96.7 | ABS 100 | PET 100 | PPS 100 | PPO 100 |
| | Side-chain crystalline polymer A | mass % | | | | | | | | |
| | Carbon nanotube 1 | parts by mass | | | | | 1 | 1 | 1 | 1 |
| | Carbon nanotube 2 | parts by mass | | | | | | | | |
| | Side-chain crystalline polymer A/Carbon nanotube MB | mass % | 3.3 | 3.3 | 3.3 | 3.3 | | | | |
| Evaluation | IZOD impact strength ($KJ/m^2$) | | 8 | 6 | 8 | 12 | 8 | 6 | 8 | 12 |
| | Volume resistivity | | 8 × 10E9 | 8 × 10E11 | 8 × 10E8 | 4 × 10E10 | >10E16 | >10E16 | >10E16 | >10E16 |
| | MI (measurement temp.) | | 15 (240° C.) | 24 (260° C.) | 5 (300° C.) | 5 (300° C.) | 12 (240° C.) | 20 (260° C.) | 3 (300° C.) | 3 (300° C.) |
| | Molding appearance | | No problem | No problem | No problem | No problem | Silver | No problem | Silver | Silver |
| | Release hydropressure | | 16 | 15 | 15 | 27 | 27 | 22 | 25 | Not released |

TABLE 2-continued

|  |  | Ex. 6 | Ex. 7 | Ex. 8 | Ex. 9 | Comp. Ex. 4 | Comp. Ex. 5 | Comp. Ex. 6 | Comp. Ex. 7 |
|---|---|---|---|---|---|---|---|---|---|
| Solvent resistance | | Slight craze | No change | No change | No change | Slight craze | No change | No change | No change |
| Flame retardancy | 1.5 mm | V-2 | V-2 | V-0 | V-0 | NG | NG | V-0 | V-0 |

Tables 1 and 2 shows the following characteristics.

The test samples of the Examples showed excellent impact resistance, conductive (antistatic) property, solvent resistance, molding appearance, mold-releasability, and flame retardancy. When the samples were produced from the master batch, impact resistance and conductive (antistatic) property were further enhanced.

Furthermore, use of surface-treated carbon nanotube remarkably enhanced conductivity and impact resistance.

In contrast, the test sample of Comparative Example 1, containing aromatic polycarbonate as a sole component, exhibited no conductive (antistatic) property and low solvent resistance.

Even when carbon nanotube was added, in the same amount as employed in Examples 1 and 2, to the test sample of Comparative Example 2, containing solely aromatic polycarbonate, conductive (antistatic) property, solvent resistance, and flame retardancy were not enhanced, and molding appearance was impaired.

The test sample of Comparative Example 3, containing the aromatic polycarbonate and side-chain crystalline polymer in the same amounts as employed in Examples 3 to 5 but containing no carbon nanotube, the sample exhibited no conductive (antistatic) property or flame retardancy, and exhibited low impact resistance. Laminar peeling was observed in the molded product.

Table 3 shows the following characteristics.

The test samples of the Examples exhibited excellent appearance, no release of carbon, and excellent conductivity.

In addition, use of surface-treated carbon nanotube further enhanced conductivity.

The test sample of Comparative Example 8, containing solely side-chain crystalline polymer, exhibited no conductivity.

The test sample of Comparative Example 9, containing carbon black, exhibited impaired appearance. Carbon may be released from the test sample, and high conductivity cannot be attained.

The test sample of Comparative Example 10, containing carbon fiber, exhibited impaired appearance and did not attain high conductivity.

Referential Example 1

Production of Side-Chain Crystalline Polymer A

Preparation of Catalyst (1) Production of 2-chlorodimethylsilylindene

Under a stream of nitrogen gas, THF (tetrahydrofuran) (50 mL) and magnesium (2.5 g, 41 mmol) were added to a 1 L three-neck flask, and 1,2-dibromoethane (0.1 mL) was added to the mixture. The resultant mixture was stirred for 30 minutes for activating magnesium.

After completion of stirring, the solvent was removed, and THF (50 mL) was newly added.

To the mixture, a solution of 2-bromoindene (5.0 g, 25.6 mmol) in THF (200 mL) was added dropwise over two hours.

After completion of addition, the reaction mixture was stirred at room temperature for two hours and then cooled to −78° C. A solution of dichlorodimethylsilane (3.1 mL, 25.6 mmol) in THF (100 mL) was added dropwise to the cooled mixture over one hour, and the resultant mixture was stirred for 15 hours, followed by removing the solvent.

The formed residue was extracted with hexane (200 mL), and the solvent was distilled off, to thereby yield 6.6 g (24.2 mmol) of 2-chlorodimethylsilylindene (yield: 94%).

(2) Production of (1,2'-dimethylsilylene) (2,1'-dimethylsilylene)-bis(indene)

Under a stream of nitrogen gas, THF (400 mL) and 2-chlorodimethylsilylindene (8 g) were added to a 1 L three-neck flask, and the mixture was cooled to −78° C.

To the solution, a 1.0-mol/L solution of $LiN(SiMe_3)_2$ in THF (38.5 mL, 38.5 mmol) was added dropwise.

After stirring of the mixture at room temperature for 15 hours, the solvent was distilled off, and the residue was extracted with hexane (300 mL).

The solvent was distilled off, to thereby yield 2.0 g (6.4 mmol) of (1,2'-dimethylsilylene) (2,1'-dimethylsilylene)-bis(indene) (yield: 33.4%).

TABLE 3

|  |  |  | Ex. 10 | Ex. 11 | Ex. 12 | Ex. 13 | Comp. Ex. 8 | Comp. Ex. 9 | Comp. Ex. 10 |
|---|---|---|---|---|---|---|---|---|---|
| Composition | Side-chain crystalline polymer A | mass % | 95 | 70 | 95 | 40 | 100 | 70 | 95 |
|  | Carbon nanotube 1 | mass % | 5 | 30 |  | 60 |  |  |  |
|  | Carbon nanotube 2 | mass % |  |  | 5 |  |  |  |  |
|  | Carbon black | mass % |  |  |  |  |  | 5 |  |
|  | Carbon fiber | mass % |  |  |  |  |  |  | 5 |
| Evaluation | Volume resistivity |  | 5 × 10E2 | 5 × 10E−2 | 8 | 1 × 10E−2 | >E16 | 4 × 10E3 | 8 × 10E7 |
|  | Molding appearance |  | Good | Good | Good | Good | Good | Rough | Rough |
|  | Carbon adhesion |  | No | No | No | No | No | Yes | No |

(3) Production of (1,2'-dimethylsilylene) (2,1'-dimethylsilylene)bis(3-trimethylsilylmethylindenyl)zirconium dichloride Under a stream of nitrogen gas, (1,2'-dimethylsilylene) (2,1'-dimethylsilylene)bis(indene) (2.5 g, 7.2 mmol) and ether (100 mL) were added to a 200-mL Schlenk flask.

The mixture was cooled to −78° C., and a 1.6M solution of n-butyllithium (n-BuLi) in hexane (9.0 mL, 14.8 mmol) was added to the cooled mixture, followed by stirring at room temperature for 12 hours.

After removal of the solvent, the formed solid was washed with hexane (20 mL) and dried under reduced pressure, to thereby produce a quantitative amount of a lithium salt as white solid.

In a Schlenk flask, (1,2'-dimethylsilylene) (2,1'-dimethylsilylene)bis(indene) lithium salt (6.97 mmol) was dissolved in THF (50 mL), and iodomethyltrimethylsilane (2.1 mL, 14.2 mmol) was slowly added dropwise to the solution at room temperature, followed by stirring for 12 hours.

After removal of the solvent, ether (50 mL) was added to the residue, and the mixture was washed with a saturated ammonium chloride solution.

After phase separation, the organic phase was dehydrated, and the solvent was removed, to thereby yield 3.04 g (5.9 mmol) of (1,2'-dimethylsilylene) (2,1'-dimethylsilylene)bis(3-trimethylsilylmethylindene) (yield: 84%).

Subsequently, under a stream of nitrogen gas, the above-produced (1,2'-dimethylsilylene) (2,1'-dimethylsilylene)bis(3-trimethylsilylmethylindene) (3.04 g, 5.9 mmol) and ether (50 mL) were added to a Schlenk flask.

The mixture was cooled to −78° C., and a 1.6M solution of n-butyllithium (n-BuLi) in hexane (7.4 mL, 11.8 mmol) was added to the cooled mixture, followed by stirring at room temperature for 12 hours.

After removal of the solvent, the formed solid was washed with hexane (40 mL), to thereby produce 3.06 g of a lithium salt ether adduct.

The $^1$H-NMR results of the compound are as follows:
$^1$H-NMR (90 MHz, THF-d8): δ0.04 (s, —SiMe$_3$, 18H), 0.48 (s, -Me$_2$Si—, 12H), 1.10 (t, —CH$_3$, 6H), 2.59 (s, —CH$_2$—, 4H), 3.38 (q, —CH$_2$—, 4H), 6.2-7.7 (m, Ar—H, 8H).

Under a stream of nitrogen gas, the above-produced lithium salt (3.06 g) was suspended in toluene (50 mL).

The suspension was cooled to −78° C., and a suspension of zirconium tetrachloride (1.2 g, 5.1 mmol) in toluene (20 mL), which had been cooled at −78° C. in advance, was added to the lithium salty suspension.

After completion of addition, the mixture was stirred at room temperature for six hours.

The solvent of the reaction mixture was distilled off, and the formed residue was recrystallized from dichloromethane, to thereby yield 0.9 g (1.33 mmol) of (1,2'-dimethylsilylene) (2,1'-dimethylsilylene)bis(3-trimethylsilylmethylindenyl) zirconium dichloride in the form of yellow microcrystals (yield: 26%).

The $^1$H-NMR results of the compound are as follows:
$^1$H-NMR (90 MHz, CDCl$_3$): δ0.0 (s, —SiMe$_3$, 18H), 1.02, 1.12 (s, -Me$_2$Si—, 12H), 2.51 (dd, —CH$_2$—, 4H), 7.1-7.6 (m, Ar—H, 8H)

(4) Production of Side-Chain Crystalline Polymer A

To a 1 L autoclave which had been heated and dried, 1-octadecene (C18) (400 mL) and triisobutylaluminum (0.5 mmol) were added, and the system was heated to 80° C.

When the temperature reached 80° C., the above-produced (1,2'-dimethylsilylene) (2,1'-dimethylsilylene)bis(3-trimethylsilylmethylindenyl)zirconium dichloride (1.0 μmol) and dimethylanilinium borate (4.0 μmol) were added to the autoclave under stirring, and hydrogen (0.8 MPa) was further fed to the system, and polymerization was performed for 240 minutes.

After completion of polymerization, reprecipitation was repeatedly performed with acetone, to thereby thoroughly precipitate a reaction product. The product was dried through heating under reduced pressure, to thereby yield 243.0 g of a higher α-olefin polymer.

The physical properties of the produced polymer was determined, and the results are shown in Tables 4 and 5.

The aforementioned molecular weight distribution (Mw/Mn) was calculated from weight average molecular weight (Mw) and number average molecular weight (Mn) (as reduced to polystyrene) determined through the GPC method by means of the apparatuses and under the conditions described below.

GPC Apparatuses
 Column: TOSO GMHHR-H(S)HT
 Detector: RI detector for liquid chromatogram "WATERS 150C"
Measurement Conditions
 Solvent: 1,2,4-trichlorobenzene
 Measurement temperature: 145° C.
 Flow rate: 1.0 mL/min
 Sample concentration: 2.2 mg/mL
 Injection amount: 160 μL
 Calibration curve: Universal Calibration
 Analysis program: HT-GPC (Ver. 1.0)

TABLE 4

| | Mw (PS) | Mw/Mn | TmD (° C.) | ΔHD (J/g) | Tm (° C.) | ΔH (J/g) | Wm (° C.) | M2 (mol %) | M4 (mol %) | MR (mol %) | X1 | X intensity ratio (%) |
|---|---|---|---|---|---|---|---|---|---|---|---|---|
| Ref. Ex. 1 | 20,000 | 1.8 | 45.2 | 99.2 | 42.1 | 92.8 | 2.6 | 63.4 | 35.8 | 16.3 | 21.0 | 100 |

TABLE 5

| | T1 (ms) at various temperatures ° C. | | | | |
|---|---|---|---|---|---|
| | 30 | 35 | 40 | 45 | 50 |
| Ref. Ex. 1 | 199 | 198 | 147 | 94 | 97 |

INDUSTRIAL APPLICABILITY

The resin composition of the present invention has a stabilized thermoplastic resin/side-chain crystalline polymer phase structure, is free from laminar peeling, and is excellent in conductive (antistatic) property, solvent resistance, flow characteristics, flame retardancy, impact resistance, molding appearance, etc.

Thus, the composition is expected to find a wide variety of applications including an OA apparatus, an information and communication apparatus, an automobile part, or a housing and a part of household electric and electronic appliances, as well as automobile parts.

The invention claimed is:

1. A resin composition comprising
   100 parts by mass of a resin component containing 80 to 99 mass % of an aromatic polycarbonate resin (A) and 20 to 1 mass % of a side-chain crystalline polymer formed from a C≧10 higher alpha-olefin (B), and
   0.1 to 30 parts by mass of carbon nanotube (C).

2. The resin composition of claim 1, wherein component (A) has a viscosity average molecular weight of 10,000 to 40,000.

3. The resin composition of claim 1, wherein the component (C) has an amorphous carbon particle content of 20 mass % or less, an outer diameter of 0.5 to 120 nm, and a length of 500 nm or more.

4. An OA apparatus, an information and communication apparatus, an automobile part, or a household electric appliance comprising the resin composition of claim 1.

5. A process for producing a resin composition of claim 1, wherein the process comprises adding component (C) to component (B) which is in a molten state, kneading the formed mixture, adding component (A) to the kneaded product, and melt-kneading the resultant mixture.

6. A molded product formed from a resin composition as recited in claim 1.

7. A molded product which is formed from a resin composition produced by the process as recited in claim 5.

8. The resin composition as described in claim 1, wherein the higher alpha-olefin is a C10 to C40 olefin.

9. The resin composition as described in claim 1, wherein the higher alpha-olefin is a C14 to C24 olefin.

10. The resin composition as described in claim 1, wherein the higher alpha-olefin polymer has an isotactic structure.

11. The resin composition as described in claim 1, wherein the higher alpha-olefin polymer has a tacticity index (M2) of 50 to 90 mol %.

12. The resin composition of claim 1, wherein carbon nanotube (C) is present in amount of 0.3 to 10 parts by mass.

13. The resin composition as described in claim 11, wherein the tacticity index (M2) is 55 to 85 mol %.

14. The resin composition as described in claim 11, wherein the tacticity index (M2) is 55 to 75 mol %.

* * * * *